United States Patent [19]
Tanaka

[11] 4,125,238
[45] Nov. 14, 1978

[54] CORD HOLDER

[75] Inventor: Toshie Tanaka, Machida, Japan

[73] Assignee: Nifco, Inc., Tokyo, Japan

[21] Appl. No.: 785,490

[22] Filed: Apr. 7, 1977

[30] Foreign Application Priority Data

Apr. 9, 1976 [JP] Japan .............................. 51-43155[U]

[51] Int. Cl.² .............................................. F16L 5/00
[52] U.S. Cl. .................... 248/56; 174/153 G;
339/103 B; 339/103 M
[58] Field of Search ........... 248/56; 174/65 G, 152 G,
174/153 G; 339/103 R, 103 B, 103 C, 103 M,
105, 126 RS; 16/2

[56] References Cited

U.S. PATENT DOCUMENTS

| | | | |
|---|---|---|---|
| 2,573,600 | 10/1951 | Pruehs .............................. | 174/153 G |
| 3,249,687 | 5/1966 | Klumpp .............................. | 174/153G |
| 3,258,234 | 6/1966 | Fernberg .............................. | 248/56 |
| 3,502,917 | 3/1970 | Bizoe .............................. | 174/153 G |
| 3,529,795 | 9/1970 | Van Niel .................... | 248/74 PB X |
| 3,622,943 | 11/1971 | Reimer .............................. | 339/103 M |
| 3,809,798 | 5/1974 | Simon .............................. | 248/56 X |
| 3,835,445 | 9/1974 | Hardesty .............................. | 339/105 X |
| 3,945,594 | 3/1976 | Burt .............................. | 248/56 X |
| 3,958,300 | 5/1976 | Tanaka .............................. | 174/153 G |
| 3,967,050 | 6/1976 | Makihara et al. .................... | 248/56 X |
| 4,034,944 | 7/1977 | Moran .............................. | 248/56 |
| 4,056,252 | 11/1977 | Simon .............................. | 248/56 |

FOREIGN PATENT DOCUMENTS 929,908 7/1955 Fed. Rep. of Germany ...... 339/103 R
2,254,132 7/1975 France .............................. 174/153 G

*Primary Examiner*—Rodney H. Bonck
*Attorney, Agent, or Firm*—Jack R. Halvorsen; Robert W. Beart

[57] ABSTRACT

A right angle strain relief grommet or cord holder which comprises a cylindrical grommet member having a circumferentially disposed flange provided intermediate the axial extremities thereof and resilient engaging projections disposed at a distance from said flange equaling the thickness of an apertured panel for accepting said cord holder therein and a lid member adapted to be integrally connected with said grommet member through the medium of a hinge piece and the lid further being provided on the free end side thereof with an outlet for leading out a cord.

A cord desired to be passed through a panel, such as of an electric appliance, can be safely and securely held in position against said panel by inserting the grommet member of said cord holder into a complementary hole bored in the panel and allowing the panel to be grasped between the flange and the resilient engaging projections, passing said cord through the interior of the grommet member and the outlet of the lid member, bringing the lid member into engagement with the grommet member so as to bend the card and close the upper opening of said holding grommet member and coupling the grommet member and the lid member with the aid of suitable fastening means.

1 Claim, 5 Drawing Figures

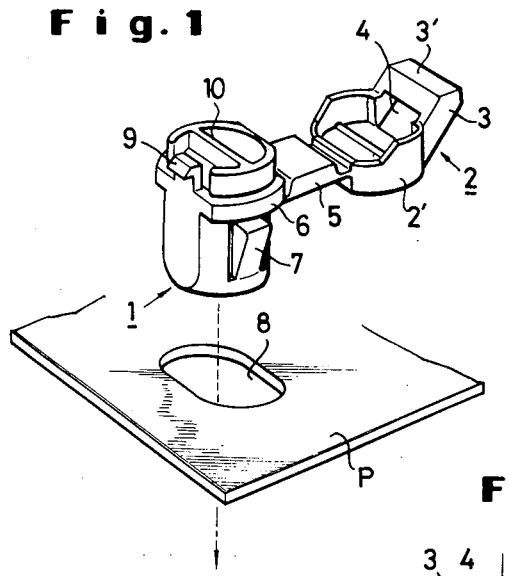
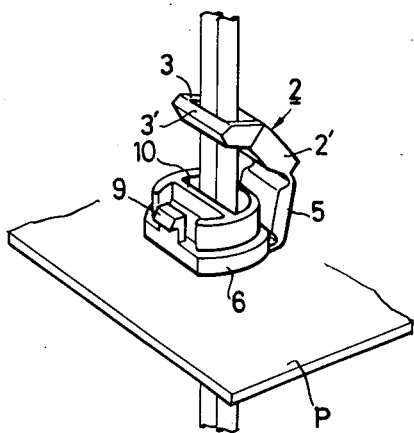
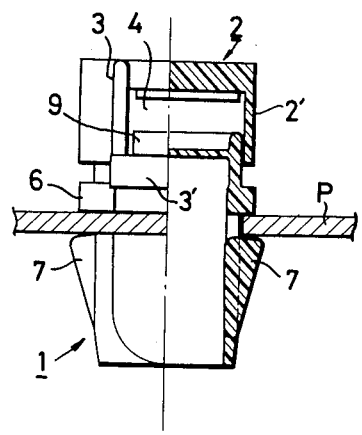
Fig. 1
Fig. 2
Fig. 5

CORD HOLDER

BACKGROUND OF THE INVENTION

This invention relates to a light angle strain relief grommet or cord holder. More particularly, the present invention relates to a one piece cord holder made of a plastic material and used, where a lead wire drawn out of an electric appliance is extended out through a hole bored in the frame of said appliance, to fasten said lead wire immovably inside said hole. electric appliance, a bushing or grommet made or rubber is set in position in the bored hole to prevent the outer coat of the cord from being injured by the edge of the bored hole. This bushing generally is only an annular member and merely serves to pass the cord through the interior thereof. The bushing, therefore, readily comes out of position when pulled from outside and, at times, allows the cord to be torn off at the connected portion. To preclude this problem, therefore, there has been adopted a method which comprises allowing the cord, at the point at which it emerges from the bored hole, to be bent perpendicularly and extended along the outer face of the frame, placing a gate-shaped fastening member astraddle the cord and fastening said member is position on the frame with nails or screws and, by virtue of the bend thus formed in the cord at the particular point, preventing the cord from otherwise possible ready movement. Since this conventional method adds to the number of parts to be used for fastening the cord, the work involved in the manufacture of electric appliances on a volume production basis is complicated and the efficiency of the work is degraded consequently. Further since the fastening of the cord requires use of nails, wood screws, etc., the material of which the frame can be fabricated is limited. Thus, this method has entailed a disadvantage that it cannot be applied to a large proportion of electric appliances using frames of metallic plates or plastic plates.

An object of the present invention is to provide right angle strain relief grommet or a cord holder of outstanding workability, which cord holder, when simply inserted into a hole bored in the frame of an electric appliance, serves effectively to fasten itself against the bored hole and, at the same time, to enable the cord passed through the interior thereof to be confined by a single motion into a perpendicularly bent state and consequently obstruct the cord completely from possible movement in the direction of its length.

Another object of this invention is to provide a one piece cord holder capable of being integrally shaped easily by the injection molding of a plastic material.

SUMMARY OF THE INVENTION

To accomplish the objects described above according to the present invention, there is provided a cord holder which comprises a substantially grommet member having a circumferentially disposed flange provided intermediate the axial extremities thereof and resilient engaging projections disposed at from said flange equaling the thickness of an apertured panel for complementarily accepting said cord holder therein and a lid member adapted to be integrally connected to said holding member through the medium of a hinge and provided on of the lid with an outlet for permitting egress of the cord in right angle relationship to the portion of the cord passing through the grommet member.

The cord holder of the present invention permits the cord, at the point at which it emerges to the outer face of the panel, to be disposed along the panel surface and held down immovably in that state when the cord holder is put to use by a procedure of passing the grommet member through a complementary hole bored in the panel until the panel is held fast between the flange and the resilient engaging projections, inserting the cord through the interior of the grommet member and the outlet of the lid member and thereafter, bending the cord by bringing the lid member into engagement with the grommet member so as to close the upper opening of the grommet member, and joining the two members immovably.

The other objects and characteristic features of the present invention will become apparent from the description to be given in full detail with reference to the accompanying drawing.

BRIEF DESCRIPTION OF THE DRAWING

FIG. 1 is a perspective view of one preferred embodiment of the cord holder of the present invention shown with the lid member stretched out.

FIG. 2 is a perspective view of the cord holder of FIG. 1, as attached to a panel with a cord passed therethrough.

FIG. 5 is a half-sectional front elevation of the cord holder of FIG. 1 in the condition in which it is used.

DESCRIPTION OF THE PREFERRED EMBODIMENT

Figure 3:
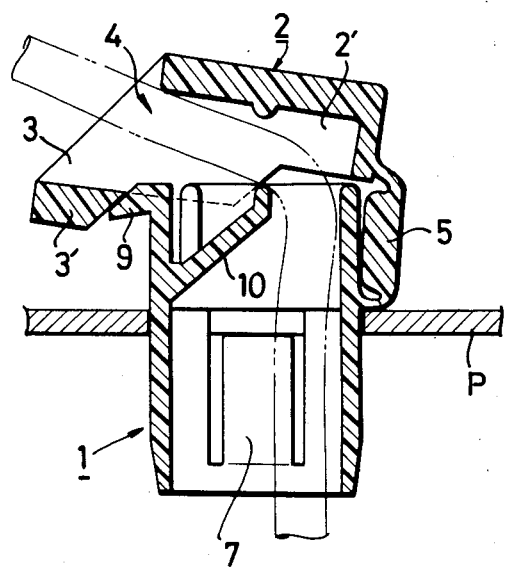
FIG. 3 is a sectional side elevation of the cord holder of FIG. 1, illustrating the condition of immovable engagement of the grommet member and the lid member.

The one piece cord holder according to the present invention is composed principally of a grommet member 1 formed in a substantially cylindrical shape fitting into a complementary hole 8 bored in a given panel P and a lid member 2 integrally connected a side wall of to said grommet member 1 through means of a hinge 5.

In order that the grommet member 1 may be immovably attached to the bored hole 8 of the panel, it has a circumferentially disposed flange 6 provide intermediate the extremities thereof and symmetrically opposite resilient engaging projections 7, 7 disposed at a distance approximately equaling the thickness of the panel from said flange. The resilient engaging projections 7, 7 in this embodiment include symmetrically disposed opposite parts or resilient arms on the circumference of the holding member 1, which parts extend outwardly so that the free ends thereof protrude to positions opposite the flange 6. While the grommet member is passed through the bored hole in the panel, the engaging projections 7, 7 are pushed back or radially inwardly, by the edge of the bored hole and caused to sink into the grommet member, permitting passage of the holding member past the edge. After the panel has ridden over the engaging projections 7, 7 the engaging projections thrust out to their original protruding positions. In conjunction with the flange 6, the engaging projections prevent the cord holder from being released from the panel and at the same time protect the grommet member against loosening (FIG. 5).

The lid member 2 is connected to a laterall wall of the grommet member 1, at or adjacent flange 6, through the medium of a hinge portion 5 which is joined at one end by a thinned bendable means to the lateral wall of the grommet member 1 and by a similar thinned means at the opposite end of hinge portions to lid member 2. Lid member 2 is formed in the shape of a cap comprising a flat lid plate and a side wall 2' hanging from the periphery of the lid plate. It is adapted so that the lid member can be positioned adjacent the upper opening of the grommet member 1. The lid member 2 has a part removed from the side wall 2 portion thereof opposite the point at which the lid member joins the hinge portion 5, so as to form an outlet 4 for leading out the cord. As illustrated, the rising portion of the side wall portion 2' is formed high enough to permit passage of the cord so that the outlet 4 formed in the side wall portion 2' is not closed by the edge of the opening when the lid member 2 is positioned in closed relation with the upper axial opening of the grommet member. In the illustrated embodiment, the outlet 4 for passage of the cord is defined by an engaging window frame 3 possessed of a stepped portion 3' protruding in a stepped manner relative to the flat lid plate of the lid member 2.

This engaging window frame 3 is so adapted that when the lid member is placed so as to close the upper opening of the grommet member, said window frame stepped portion 3 will come into hooking engagement with the shoulder of engaging claw 9 formed to extand laterlly outwardly adjacent the upper opening as viewed in the drawing, of the grommet member opposite the point at which the lid member joins the hinge piece 5. (See FIGS. 3-4.) In this illustrated embodiment, the outlet 4 for withdrawal of the cord is formed in the shape of a square window frame in due consideration of the aforementioned relationship with the engaging claw 9. In a different embodiment now shown, wherein this engaging claw 9 is so adapted as to be brought into hooking engagement with a different portion of the lid member to preclude inadvertent release of the lid member, said outlet need not necessarily be limited to such a square window frame. In this case, the engaging window frame 3 may be omitted and the side wall 2' may simply be cut to form an outlet for withdrawal of the cord.

The grommet member 1 preferably is provided with an obstructing transverse wall 10 extending angularly upwardly from the interior portion of the interior of grommet member 1 so as to form a constriction in the upper opening and leave a space approximately equaling the thickness of the cord being inserted through the interior of the grommet member. The constriction serves the purpose of checking the lateral movement of the cord within the interior of the grommet member.

Figure 4:
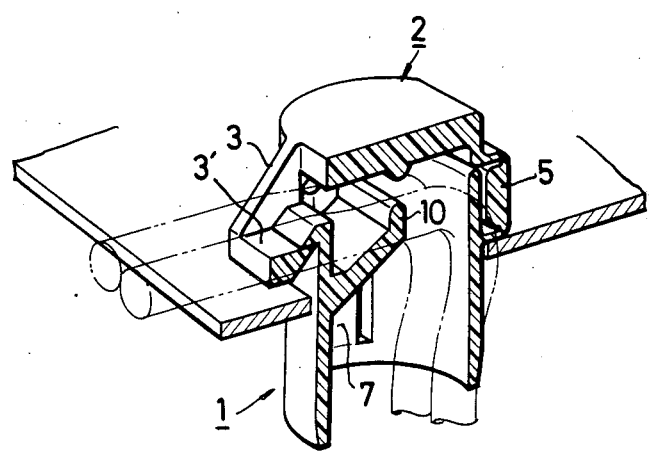
FIG. 4 is a perspective sectional view of the cord holder of FIG. 1 in the condition in which it is used.

In its actual manufacture, the cord holder of this invention having a construction as described above is integrally molded by fabricating a mold strictly conforming to the cord holder including the component parts, i.e. holding member 1, lid member 2 and hinge portion 5, stretched out as illustrated in FIG. 1 and injecting a hot molten thermoplastic material into said mold. The actual use of this cord holder is effected as described above by first inserting the grommet member 1 complementary hole 8 bored in the panel until it is lodged in the bored hole 8 in a state immobilized by the flange 6 and the resilient engaging projections 7, 7, then passing the cord through the interior of the grommet member 1 and drawing it out of the upper opening thereof, further passing the cord through the outlet 4 formed for passage of the cord in the lid member 2 held in its open state and thereby allowing the cord to be drawn out from below the panel (actually from the interior of an electric appliance) to the outside of the panel (FIG. 2), subsequently bringing the lid member 2 connected through the medium of said hinge portion into closing contact with the upper opening of the grommet member while bending the cord and finally causing the stepped portion 3' protruding from the of window frame 3 to come into hooking engagement with the engaging claw 9 provided on the grommet member (FIGS. 3-4).

Consequently at the point where the cord inserted into the interior of the cord holder extends through the interior of the grommet member and emerges straightly from the upper opening, the closure of the lid member forcibly bends the cord perpendicularly in the lateral direction of the lid member and, because of the resilient force of the cord which functions as a repulsive force, keeps the cord in pressed contact with the grommet member and the lid member. Thus, the cord is held firmly inside the interior of said cord holder. Further in this case, the fastening of the cord is all the more insured by the fact that in the aforementioned embodiment, the obstructing wall 10 disposed in an angular manner in the upper opening of the grommet member adds to the force with which the cord is held in its bent state and offers added resistance.

As described above, the cord holder of the present invention can easily be fitted to the hole bored in the panel and can firmly grip the cord by the closure of the lid member. In a mass-production system in which products flow along an assembly line, therefore, the cord holders of the present invention have an advantage that they enjoy high workability and permit the assembly to be accomplished with notably high efficiency.

Moreover, since the cord holder of the present invention can be formed integrally with a plastic material as described above, it can be offered at a low price. It has an additional advantage that because of its unitary construction, it insures ease of handling.

What is claimed is:

1. A one piece plastic right angle strain relief grommet or cord holder, comprising a substantially cylindrical hollow grommet member having a through bore and having a circumferentially disposed flange means provided intermediate the extremitites thereof and resilient engaging projections disposed at a distance from said flange means substantially equaling the thickness of an apertured panel adapted for accepting the cord holder therethrough;

a hinge means including a central portion extending laterally from and connected by flexible means along one end of said central portion to said grommet member adjacent said flange;

a lid member connected at one edge by flexible means to the opposite end of said hinge means central portion and said lid member being provided at the opposite free edge thereof with an outlet restraining means for passage of a cord;

a projecting wall-like means disposed angularly from a point intermediate the extremities of the side wall of said grommet member defining said through bore in a direction toward said hinge means to form a constriction in the end opening of said grommet member and thereby obstruct the movement of the cord inserted through said bore of said grommet member, cooperative means disposed opposite said hinge means for locking said lid member relative to said grommet member, said cooperative means for locking said grommet member and said lid member comprise respectively, at the side of the cord holder opposite to the points of connection of said member and lid with said hinge means, an engaging claw and an engaging window frame acting as said outlet of said lid member and adapted for engagement with said engaging claw so as to retain said grommet member and said lid member in their closed engagement, whereby when a cord is inserted through the bore of said grommet member and the outlet of said lid member and said lid member is brought into locked closed position relative to the end bore opening of said grommet member, said cord is bent into a right angle position relative to said panel and restrained against displacement.

* * * * *